United States Patent
Guerrero et al.

(10) Patent No.: US 8,448,246 B2
(45) Date of Patent: May 21, 2013

(54) PROTECTING SENSITIVE EMAIL

(75) Inventors: Richard Guerrero, Odessa, FL (US); Nicholas Sellier, Satellite Beach, FL (US)

(73) Assignee: Raytheon Company, Waltham, MA (US)

( * ) Notice: Subject to any disclaimer, the term of this patent is extended or adjusted under 35 U.S.C. 154(b) by 230 days.

(21) Appl. No.: 12/832,232

(22) Filed: Jul. 8, 2010

(65) Prior Publication Data

US 2012/0011361 A1    Jan. 12, 2012

(51) Int. Cl.
*G06F 21/00*    (2006.01)

(52) U.S. Cl.
USPC .................................. 726/22; 726/23; 726/24

(58) Field of Classification Search
USPC ........................................................ 726/22–24
See application file for complete search history.

(56) References Cited

U.S. PATENT DOCUMENTS

| | | |
|---|---|---|
| 7,191,252 B2 | 3/2007 | Redlich et al. |
| 7,487,213 B2 | 2/2009 | Zager et al. |
| 7,580,982 B2 | 8/2009 | Owen et al. |
| 2004/0172429 A1* | 9/2004 | Goguen ................. 707/206 |
| 2005/0144245 A1 | 6/2005 | Lowe |
| 2006/0047766 A1* | 3/2006 | Spadea, III .............. 709/206 |
| 2007/0033258 A1* | 2/2007 | Vasilaky et al. ......... 709/206 |
| 2007/0033283 A1* | 2/2007 | Brown ..................... 709/226 |
| 2008/0104712 A1* | 5/2008 | Oliver et al. .............. 726/27 |
| 2010/0095377 A1* | 4/2010 | Krywaniuk ............... 726/22 |

* cited by examiner

*Primary Examiner* — Ghazal Shehni
(74) *Attorney, Agent, or Firm* — Schwegman Lundberg & Woessner, P.A.

(57) ABSTRACT

According to one embodiment, a plurality of components are located within an appliance configured to send and receive email. The appliance receives an email and selects one or more policies to apply based on a designation indicating that the email communicates sensitive information. The policies determine whether to allow or block the email according to rules for assuring email. If the email is allowed, the appliance directs the email to one or more recipients.

14 Claims, 3 Drawing Sheets

PROTECTING SENSITIVE EMAIL

TECHNICAL FIELD

This invention relates generally to the field of email systems and more specifically to protecting sensitive email.

BACKGROUND

Information may be electronically communicated from a sender to a recipient via electronic mail ("email"). Certain emails may be designated classified, private, or otherwise confidential. For example, classified emails may communicate sensitive information that, by law, only particular classes of persons may access, such as information pertaining to national security. Private email may communicate information that an individual or entity considers sensitive, such as medical records or financial records.

Email designated as classified, private, and/or confidential may be subject to various policies designed to protect and defend information and information systems. For example, information assurance policies may ensure the availability, integrity, authentication, confidentiality, and non-repudiation of the information and information systems. Certain information assurance policies may be implemented using commercial-off-the-shelf (COTS) components. COTS components, however, may fail to provide a full complement of information protection methods and, thus, may fail to enforce the information assurance policies sufficiently to satisfy auditors. Additionally, installing, integrating, and configuring COTS components may be time consuming and/or costly. Furthermore, the performance of email systems assembled from COTS components may vary from system to system. Accordingly, email systems assembled from COTS components require individual accreditation.

SUMMARY OF THE DISCLOSURE

According to one embodiment, a plurality of components are located within an appliance configured to send and receive email. The appliance receives an email and selects one or more policies to apply based on a designation indicating that the email communicates sensitive information. The policies determine whether to allow or block the email according to rules for assuring email. If the email is allowed, the appliance directs the email to one or more recipients.

According to one embodiment, an appliance comprises a mail delivery agent, an adjudicator, and a mail transfer agent. The mail delivery agent receives email that includes a designation indicating whether the email communicates sensitive information and diverts the email to the adjudicator. The adjudicator selects one or more policies to apply to the email based on the designation. The policies include rules for assuring email that the adjudicator uses to determine whether to block or allow the email. If the email is allowed, the mail transfer agent directs the email to one or more recipients.

According to one embodiment, a sender requests to compose an email designated as communicating sensitive information. A list of candidate recipients authorized to receive sensitive information for the designation is sent to the sender, and a list of one or more selected recipients is received from the sender. The selected recipients are selected only from the list of candidate recipients.

Certain embodiments of the invention may provide one or more technical advantages. A technical advantage of one embodiment may be that email system components for protecting sensitive information and information systems may be provided by one appliance. Providing the components in one appliance may allow for efficient installation, integration, and configuration of the email system. Providing the components in one appliance may allow accreditors to accredit a first unit and to permit accreditation of like units based on similarity to the first unit. Another technical advantage of one embodiment may be that a full complement of methods for enforcing information assurance policies may be applied to email.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
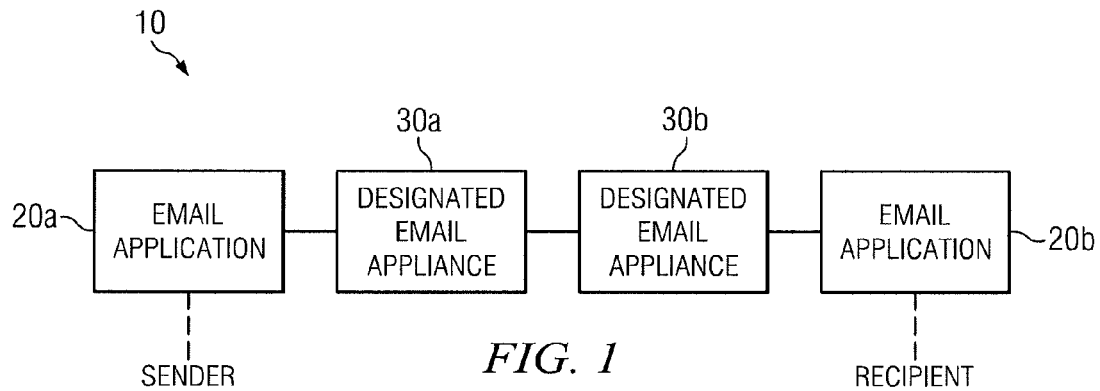
FIG. 1 illustrates an example of a system comprising a designated email appliance.

FIG. 1 illustrates an example of a system 10 for communicating email from a sender to a recipient. The email communicated by system 10 may be designated as communicating sensitive information, for example, the email may be designated classified, private, and/or otherwise confidential. Classified email may communicate sensitive information that, by law, only particular classes of persons may access, such as information pertaining to national security. Private email may communicate information that an individual or entity considers sensitive, such as medical records or financial records. Email may be designated with other suitable labels indicating any other confidentiality levels. In some embodiments, system 10 may be configured to apply one or more policies for assuring email. Policies may be applied to any suitable part of the email, such as the control fields of the email (e.g., the "To" and "Cc" fields), the body of the email, email metadata, email attachments, or a combination of the preceding.

System 10 may comprise a plurality of nodes, such as email applications 20 (20a,b) and designated email appliances 30 (30a,b). In some embodiments, the email applications 20 and designated email appliances 30 of system 10 may be associated with the same organization, such as the same company, department, or governmental entity. Accordingly, in some embodiments, system 10 may be configured to block email designated as communicating sensitive information from being transmitted to systems that are not associated with the organization.

To initiate an email communication, a sender may use email application 20 to compose an email and designate the email as communicating sensitive information. Email application 20 may comprise a desktop e-mail client or a webmail application accessed via a web browser. Examples of desktop e-mail clients include MICROSOFT OUTLOOK, PEGASUS MAIL, MOZILLA THUNDERBIRD, or APPLE INC.'s MAIL. Examples of webmail applications include GOGGLE GMAIL, YAHOO! MAIL, MICROSOFT HOTMAIL, AOL MAIL, and SQWEBMAIL. Examples of web browsers include MICROSOFT EXPLORER and FIREFOX. In some embodiments, email application 20 may comprise a proprietary application of the organization. In some embodiments, the email application 20 may not allow a user to store local copies of email on the user's computer so that the organization may maintain control of the email and better protect the information.

An email sent from email application 20a may be directed to a designated email appliance 30a associated with the sender. Designated email appliance 30a may receive the email, determine that the email is designated as communicating sensitive information, and select one or more policies to apply to the email. The policies determine whether to allow or block the email according to rules for assuring email. Rules for assuring email may be designed to protect and defend information and information systems by, for example, ensuring the availability, integrity, authentication, confidentiality, and non-repudiation of the information and/or information systems. If the email is allowed, the appliance directs the email to a recipient. For example, designated email appliance 30a may direct the email to a designated email appliance 30b associated with the recipient.

In some embodiments, designated email appliance 30b may select and apply policies for assuring email in order to determine whether to block or allow the email. Alternatively, designated email appliance 30b may direct the email to the recipient without applying its own policies. The email may be directed to the recipient via email application 20b.

Any suitable means may be used to communicate email among the nodes of system 10, including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. In some embodiments, the communication means may be selected according to its ability to adequately secure the email that system 10 communicates. For example, systems communicating classified information may require a certain level of encryption.

Although system 10 has been described in terms of certain embodiments, alterations and permutations of the embodiments will be apparent to those skilled in the art. For example, in some embodiments, the designated email appliance associated with the sender and the designated email appliance associated with the recipient may be the same appliance.

Figure 2:
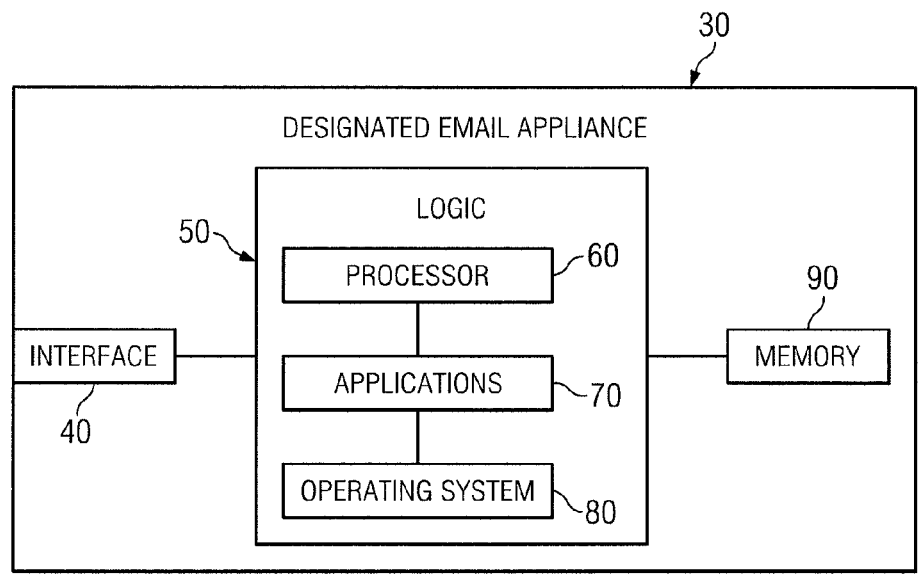
FIG. 2 illustrates an example of a designated email appliance.

FIG. 2 illustrates an example of a designated email appliance 30. In certain embodiments, designated email appliance 30 may include interface 40, logic 50, memory 90, and/or other suitable element. Interface 40 receives input, sends output, processes the input and/or output, and/or performs other suitable operation. In certain embodiments, interface 40 receives an email designated as communicating sensitive information and, upon a determination to allow the email, outputs the email. Interface 40 may comprise hardware and/or software.

Logic 50 performs the operations of the component, for example, executes instructions to generate output from input. In certain embodiments, logic 50 may determine that the email is designated as communicating sensitive information, select one or more policies to apply to the email, apply the selected policies, and determine whether to allow or block the email.

Logic 50 may include hardware (such as one or more processors 60), software (such as applications 70 and operating system 80) and/or other logic. Logic 50 may be encoded in one or more tangible media and may perform operations when executed by a computer. Certain logic 50, such as a processor 60, may manage the operation of a component. Examples of a processor 60 include one or more computers, one or more microprocessors, one or more applications, and/or other logic. Examples of operating system 80 include LINUX, UNIX, MACINTOSH, and WINDOWS operating systems.

In particular embodiments, the operations of the embodiments may be performed by one or more non-transitory, tangible computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 90 stores information. Memory 90 may comprise one or more tangible, computer-readable, and/or computer-executable storage medium, and may exclude signals or carrier waves. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 3:
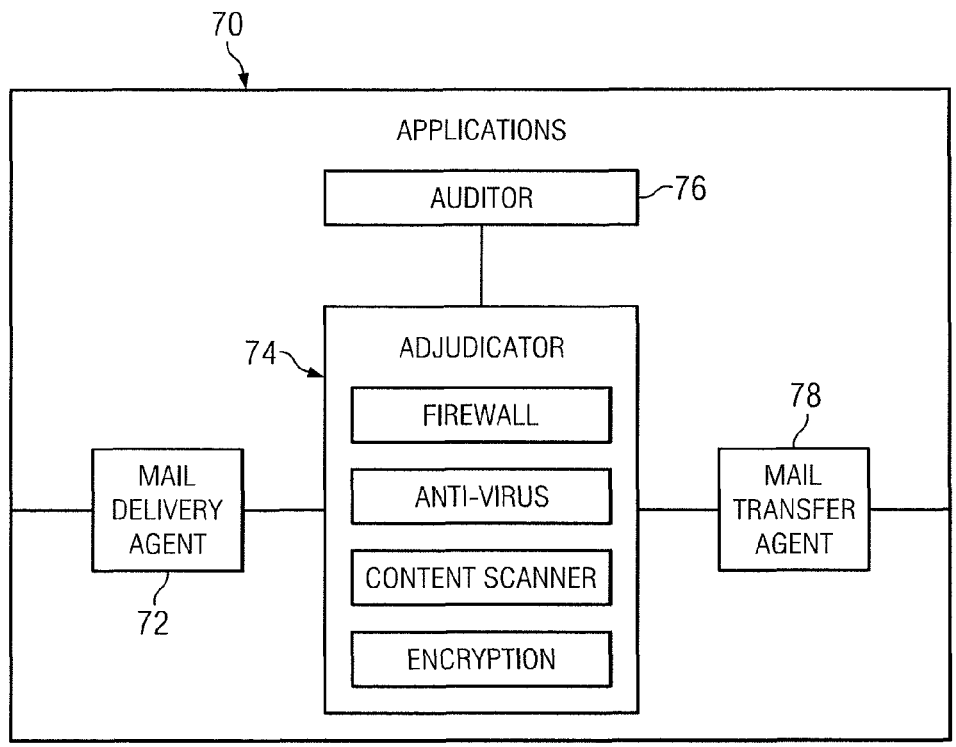
FIG. 3 illustrates examples of designated email appliance applications.

FIG. 3 illustrates examples of applications 70 of the designated email appliance 30. Applications 70 may include a mail delivery agent 72 for delivering email to and from a mailbox, an adjudicator 74 for determining whether to allow or block an email, an auditor 76 for creating audit records describing email transactions, and a mail transfer agent 78 for transferring email.

In some embodiments, mail delivery agent 72 may comprise a server associated with a client-server configuration, such as a MICROSOFT EXCHANGE server, or a webmail server, such as an SQWEBMAIL server. Mail delivery agent 72 may receive an email associated with a mailbox of the sender and divert the email to adjudicator 74. In some embodiments, mail delivery agent 72 may include custom plug-ins or glue code to enable it to divert email to adjudicator 74.

Upon receiving an email, adjudicator 74 may select one or more policies to apply based on the designation. Any suitable number of policies may be selected, for example, certain classified emails may be subject to hundreds of policies. The policies may include rules for assuring email. The rules may be applicable to the control fields of the email (e.g., the "To" and "Cc" fields), the body of the email, email metadata, and/or email attachments, if any. Adjudicator 74 may apply the rules to determine whether to allow or block an email. According to some embodiments, if an email is blocked, adjudicator 74 may evaluate the reason(s) for blocking the email and may notify a system administrator upon identifying a serious policy violation. In some embodiments, adjudicator 74 may comprise an encryption-decryption module, a firewall, a content scanner, an anti-virus module, and/or other suitable components for applying the rules.

The encryption-decryption module of adjudicator 74 may receive encrypted email and decrypt the email so that the policies may be applied. In some embodiments, adjudicator 74 may re-encrypt an allowed email prior to directing the email to the recipient. Alternatively, in some embodiments, the adjudicator 74 may receive two copies of the email. The first copy may be encrypted according to an encryption certificate associated with adjudicator 74 and the second copy may be encrypted according to an encryption certificate associated with the recipient. The encryption-decryption module may decrypt the first copy of the email while maintaining the second copy of the email in encrypted form. The policies may be applied to the first copy of the email, and the second copy of the email may be directed to the recipient if the email is allowed.

The firewall of adjudicator 74 may block the email upon detection of a trigger condition. As an example, the trigger condition may indicate that the email exceeds a maximum allowable file size, such as 20 MB, 40 MB, or 60 MB. As another example, the trigger condition may indicate the presence of an unauthorized file type. Unauthorized files may include executable files, zip files, MICROSOFT ACCESS files, or other files. As yet another example, the trigger condition may indicate that at least one of the recipients is not authorized to receive sensitive information associated with the designation. In some embodiments, an organization may define the trigger conditions for a policy according to the particular needs of the organization.

The content scanner of adjudicator 74 may block the email upon detection of a sensitive term (i.e., "dirty word") that is not authorized for the designation of the email. In some embodiments, certain sensitive terms may be authorized for one email designation that are not authorized for another designation. For example, an organization with a nuclear weapons department and a radar antennas department may define sensitive terms related to nuclear weapons (e.g., nuclear, bomb, fusion) and sensitive terms related to radar antennas (e.g., radar, antenna, Doppler). Emails containing sensitive terms related to nuclear weapons may be authorized for recipients in the nuclear weapons department and unauthorized for recipients in the radar antennas department. Similarly, emails containing sensitive terms related to radar antennas may be authorized for recipients in the radar antennas department and unauthorized for recipients in the nuclear weapons department.

In some embodiments, contextual information may be considered when determining whether to block an email that includes a sensitive term. As an example, contextual information may describe the proximity of the sensitive term to other sensitive terms. As another example, contextual information may describe the frequency with which sensitive terms are detected, such as the total number of sensitive terms or the percentage of sensitive terms as compared to non-sensitive terms.

The anti-virus module of adjudicator 74 may block the email upon detection of a virus. Any suitable method or combination of methods for detecting a virus may be used. In some embodiments, the email, including the attachments, may be scanned for signatures of known viruses. Examples of signature based scanners include MCAFEE VIRUSSCAN and NORTON ANTIVIRUS. In some embodiments, the email may be copied into a quarantined environment where attachments may be run and observed. Upon the detection of suspicious behavior in the quarantined environment, the email may be blocked. RAYTHEON R-SHIELD is an example of a quarantine based scanner.

In the event that an email is blocked, the adjudicator 74 may notify the auditor 76, and auditor 76 may create an audit record for the blocked email. The audit record may include information about the blocked email, such as the sender's identity, the intended recipients, the date and time, the reason(s) for blocking the email, a copy of the email, a copy of the email attachment, and/or other information about the blocked email. The audit record may be stored according to the organization's record retention requirements. As an example, audit records for certain classified email may be stored for 30 years.

After applying each of the selected policies, if the email has not been blocked, adjudicator 74 may allow the email. The allowed email may be sent to mail transfer agent 78 where it may be directed to one or more recipients.

Mail transfer agent 78 may comprise any agent suitable for relaying email through a network, such as from one email server to another email server. As an example, mail transfer agent 78 may comprise a QMAIL email server. In some embodiments, mail transfer agent 78 may invoke Simple Mail Transfer Protocol to relay the email.

Figure 4:
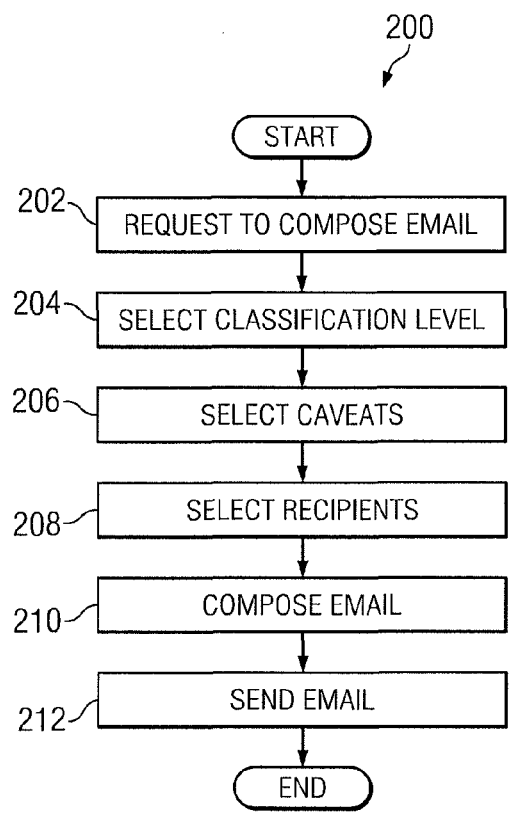
FIG. 4 illustrates an example method for composing a designated email.

FIG. 4 illustrates an example method 200 for composing a designated email. The method begins at step 202 where the sender requests to compose the email. At step 204, the sender selects a classification level for the email. In some embodiments, the classification level may include the levels of the U.S. classification system, namely, top secret, secret, confidential, for official use only, and unclassified. In some embodiments, the classification level may include designations for private information, such as private and non-private. The classification level may be used to identify a class of candidate recipients authorized to receive sensitive information. As an example, a person with top secret clearance may be authorized to receive a top secret email. As another example, a hospital may use a private classification level to indicate certain persons, such as doctors, human resources employees, or accounting employees may be authorized to receive certain email, but other persons, such as hospital volunteers, may not be authorized.

The sender may select one or more caveats at step 206. The caveats may indicate a subset of the candidate recipients authorized to receive the particular sensitive information of the email. Caveats may indicate any suitable subset, such as a department, a project name, or a record type. Continuing the hospital example, although doctors, human resources employees, and accounting employees may each have authorization to receive private emails, a "medical" caveat may indicate a doctors-only subset of candidate recipients, a "personnel" caveat may indicate a human resources employees-only subset of candidate recipients, and a "financial" caveat may indicate an accounting employees-only subset of candidate recipients. In some embodiments, a single term may be selected to indicate both the classification level and the caveat. As an example, selecting the term "medical record" may indicate a private classification level and that the subset of candidate recipients comprises only doctors.

At step 208, the sender may select the recipients for the email. In some embodiments, the recipients may be selected from a list that has been filtered based on the classification level and the caveat(s) to include only the subset of candidate recipients with authorization to receive the email. Thus, the sender may be prevented from accidentally or intentionally selecting an unauthorized recipient. By preventing the sender from attempting to select unauthorized recipients, requirements to audit such attempts may be eliminated. Alternatively, in some embodiments, the recipients may be selected from a list that has not been filtered based on the classification level and caveat(s). If the sender selects an unauthorized recipient, an error message may be generated that requests the user to remove the unauthorized recipient from the selection. If the sender proceeds with sending the email to the unauthorized recipient, actions may be taken according to an applicable policy, for example, the email may be blocked, an audit record may be created, and/or a system administrator may be notified.

In some embodiments, the list of candidate recipients may be filtered according to the current location of the sender. For example, the sender may have top secret clearance for caveats A and B. When the sender is located at his main office, he may be authorized to send and receive email with caveats A, B, or both A and B. If the sender travels to a field office, he may be authorized only for B. Accordingly, the sender may be prevented from sending emails associated with caveat A while he is located in the field office. Similarly, the sender may be prevented from receiving new emails or viewing stored emails associated with caveat A. When the sender returns to his main office, access to information related to A may be restored.

The sender may compose the email at step 210. Composing the email may include drafting text for the message body and attaching any attachments. At step 212, the sender may click a send button to initiate sending the completed email. The method then ends.

Figure 5:
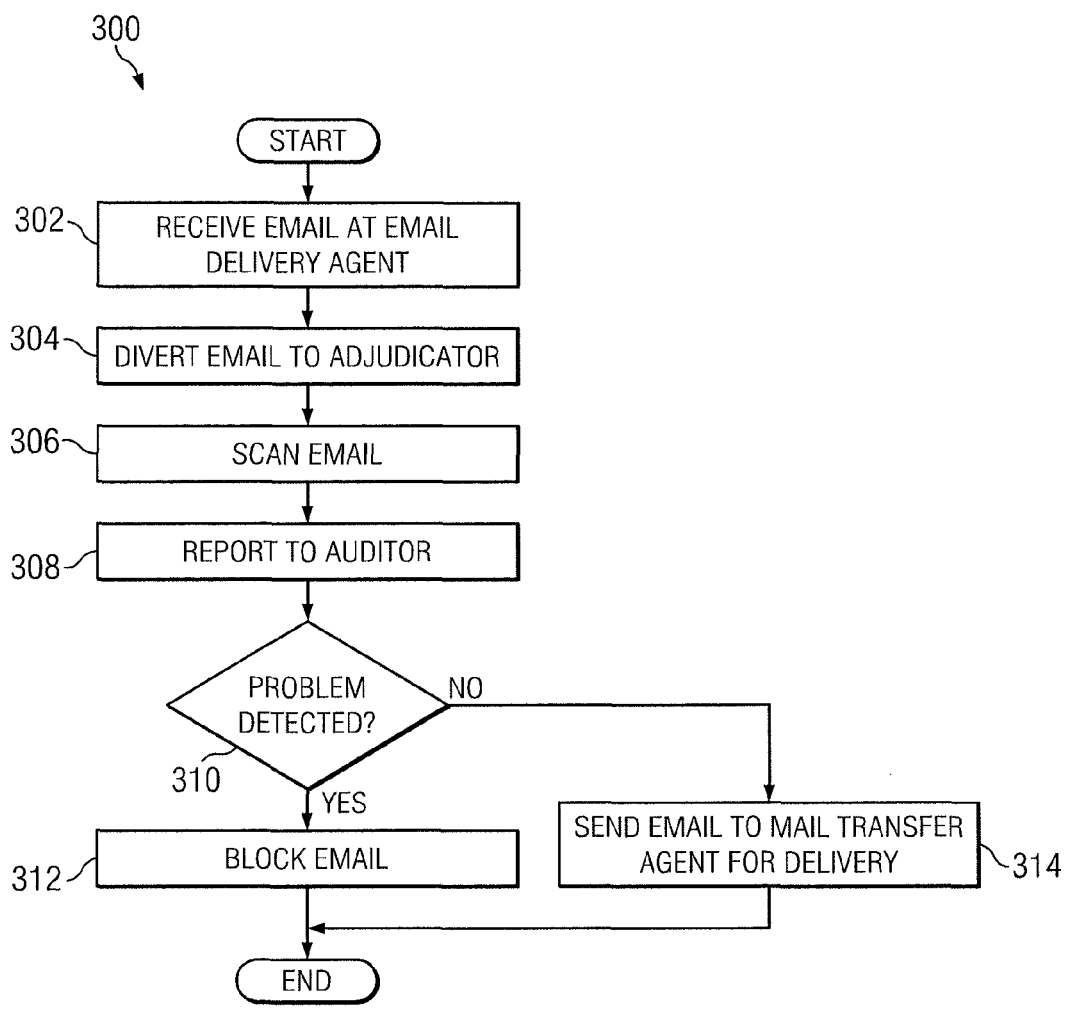
FIG. 5 illustrates an example method for adjudicating a designated email.

FIG. 5 illustrates an example of a method 300 for adjudicating a designated email. The method begins at step 302 where an email delivery agent of a designated email appliance receives an email. In some embodiments, the email may be received from a mailbox associated with a sender. The email may include a designation indicating whether the email communicates sensitive information. Examples of designations for sensitive information include, but are not limited to, top secret, secret, confidential, for official use only, and private designations. The email delivery agent may divert email to the adjudicator at step 304.

Upon receiving the email, the adjudicator may select one or more policies to apply. The policies may be selected according to the designated classification level and caveats. As an example, the policies may indicate trigger conditions for blocking an email, such as a maximum allowable file size, an unauthorized file type, or an list of unauthorized recipients. As another example, the policies may indicate one or more virus detection methods to be applied. As yet another example, the policies may indicate one or more sensitive terms that are not authorized for the classification level and caveat. In some embodiments, a term may be authorized for one caveat but sensitive for a different caveat. For example, terms like nuclear, bomb, and fusion may be authorized for a nuclear weapons caveat, but sensitive (i.e., unauthorized) for a radar antennas caveat.

At step 306, the email may be scanned according to each of the selected policies, and the results of the scan may be reported to the auditor at step 308. The auditor may create an audit record based on the results of the scan.

At step 310, it may be determined whether the scan detected a problem. In some embodiments, a problem may be detected if the email exceeds the maximum file size or if the email includes an unauthorized file type, an unauthorized recipient, a sensitive term, or a virus. Upon detecting a problem, the method may proceed to step 312 where the problem email is blocked from being sent to the recipient. If no problem is detected at step 310, the method may continue to step 314 where the email may be sent to a mail transfer agent to initiate delivery to the recipient. The method then ends.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. As used in this document, "each" refers to each member of a set or each member of a subset of a set.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
a computer hardware processor operable to:
   receive an email comprising a designation, the designation indicating whether the email communicates sensitive information; and
   divert the email; and
an adjudicator computer processor operable to:
   receive the email diverted from the computer hardware processor;
   apply one or more policies to the email, the one or more policies selected according to the designation, the one or more policies comprising rules for assuring email; and
   determine whether to allow or block the email based on the policies; and
a mail transfer computer processor operable to direct the email to one or more recipients if the email is allowed;
the adjudicator computer processor further operable to:
   receive a first copy of the email, the first copy encrypted according to an encryption certificate associated with the adjudicator computer processor;
   receive a second copy of the email, the second copy encrypted according to an encryption certificate associated with at least one of the recipients;
   decrypt the first copy of the email prior to applying the one or more policies; and
   direct the second copy of the email to the mail transfer computer processor upon a determination that the first copy of the email complies with the selected one or more policies.

2. The system of claim 1, further comprising:
an auditor computer processor operable to:
create an audit record for the email;
receive a notification indicating whether the email was allowed or blocked; and
determine the information to include in the audit record based on the notification.

3. The system of claim 1, the adjudicator computer processor further comprising:
a firewall operable to block the email upon detection of a trigger condition;

a content scanner operable to block the email upon detection of a sensitive term that is not authorized for the email's designation; and
an anti-virus computer processor operable to block the email upon detection of a virus.

4. The system of claim 1, the adjudicator computer processor further comprising a firewall operable to block the email upon detection of a trigger condition, the trigger condition indicating that:
a file size of the email exceeds a maximum allowable file size;
the email comprises an unauthorized file type; or
at least one of the recipients is not authorized to receive sensitive information associated with the designation.

5. The system of claim 1, the designation further comprising:
a classification level identifying a class of candidate recipients authorized to receive sensitive information; and
one or more caveats indicating a subset of the candidate recipients, the subset of candidate recipients authorized to receive the particular sensitive information of the email.

6. The system of claim 1, the designation further comprising a classification level selected from the group consisting of top secret, secret, confidential, for official use only, unclassified, and private.

7. The system of claim 1, the mail transfer computer processor further comprising a webmail delivery computer processor, the webmail delivery computer processor configured to prevent copying the email locally on a computer associated with a sender or the one or more recipients.

8. A method comprising:
receiving an email at a computer hardware processor;
determining using the computer hardware processor that the email is designated as communicating sensitive information;
applying using the computer hardware processor one or more policies selected according to the designation, the one or more policies comprising rules for assuring email;
determining using the computer hardware processor whether to allow or block the email based on the policies; and
directing using the computer hardware processor the email to one or more recipients if the email is allowed; and further comprising:
receiving in the computer hardware processor a first copy of the email, the first copy encrypted according to an encryption certificate associated with the appliance;
receiving a second copy of the email, the second copy encrypted according to an encryption certificate associated with at least one of the recipients;
decrypting the first copy of the email prior to applying the one or more policies; and
directing the second copy of the email to the recipient upon a determination that the first copy of the email complies with the selected one or more policies.

9. The method of claim 8, further comprising:
creating using the computer hardware processor an audit record for the email;
receiving using the computer hardware processor a notification indicating whether the email was allowed or blocked; and
determining using the computer hardware processor the information to include in the audit record based on the notification.

10. The method of claim 8, further comprising:
blocking using the computer hardware processor the email upon detection of:
a trigger condition;
a sensitive term that is not authorized for the email's designation; or
a virus.

11. The method of claim 8, further comprising:
blocking using the computer hardware processor the email upon detection of a trigger condition, the trigger condition indicating that:
a file size of the email exceeds a maximum allowable file size;
the email comprises an unauthorized file type; or
at least one of the recipients is not authorized to receive sensitive information associated with the designation.

12. The method of claim 8, the designation further comprising:
a classification level identifying a class of candidate recipients authorized to receive sensitive information; and
one or more caveats indicating a subset of the candidate recipients, the subset of candidate recipients authorized to receive the particular sensitive information of the email.

13. The method of claim 8, the designation further comprising a classification level selected from the group consisting of top secret, secret, confidential, for official use only, unclassified, and private.

14. A system comprising:
a computer hardware processor configured to:
receive an email comprising a designation, the designation indicating whether the email communicates sensitive information; and
divert the email; and
an adjudicator computer processor operable to:
receive the email diverted from the computer hardware processor;
apply one or more policies to the email, the one or more policies selected according to the designation, the one or more policies comprising rules for assuring email; and
determine whether to allow or block the email based on the policies; and
a mail transfer computer processor operable to direct the email to one or more recipients if the email is allowed;
the adjudicator computer processor further operable to:
receive a first copy of the email, the first copy encrypted according to an encryption certificate associated with the adjudicator computer processor;
receive a second copy of the email, the second copy encrypted according to an encryption certificate associated with at least one of the recipients;
decrypt the first copy of the email prior to applying the one or more policies; and
direct the second copy of the email to the mail transfer computer processor upon a determination that the first copy of the email complies with the selected one or more policies;
wherein a determination that the email is designated as communicating sensitive information includes a determination that the sensitive information is in proximity to other sensitive information and a determination of the frequency of the sensitive information in the email.

\* \* \* \* \*